United States Patent [19]

Hoffman

[11] 4,121,357
[45] Oct. 24, 1978

[54] METHOD OF TEACHING SPEECH READING

[76] Inventor: Sidney R. Hoffman, 89 Fairview Ave., New York, N.Y. 10040

[21] Appl. No.: 792,196

[22] Filed: Apr. 29, 1977

[51] Int. Cl.² ............................................. G09B 17/00
[52] U.S. Cl. ..................................................... 35/35 R
[58] Field of Search ................... 35/35 R, 35 A, 35 B, 35/35 C, 8 A

[56] References Cited

U.S. PATENT DOCUMENTS

| 2,950,543 | 8/1960 | Ritter et al. | 35/35 C |
| 3,289,326 | 12/1966 | Bender | 35/35 C |
| 3,968,576 | 7/1976 | Taylor | 35/35 B |

OTHER PUBLICATIONS

A.P.C. Application of Vignal, Ser. No. 386,191, published Apr. 27, 1943.

Primary Examiner—William H. Grieb
Attorney, Agent, or Firm—Hubbell, Cohen, Stiefel & Gross

[57] ABSTRACT

A method of teaching speech reading comprising the steps of displaying a first moving image of the facial articulatory structure of at least one person; displaying a second moving image of alphanumeric indicia representing the words spoken by said at least one person; and controlling the display of the first and second moving images for varying the time interval between the display of the alphanumeric indicia and the display of the particular facial articulatory structures corresponding thereto. Apparatus for carrying out the method is also disclosed.

15 Claims, 2 Drawing Figures

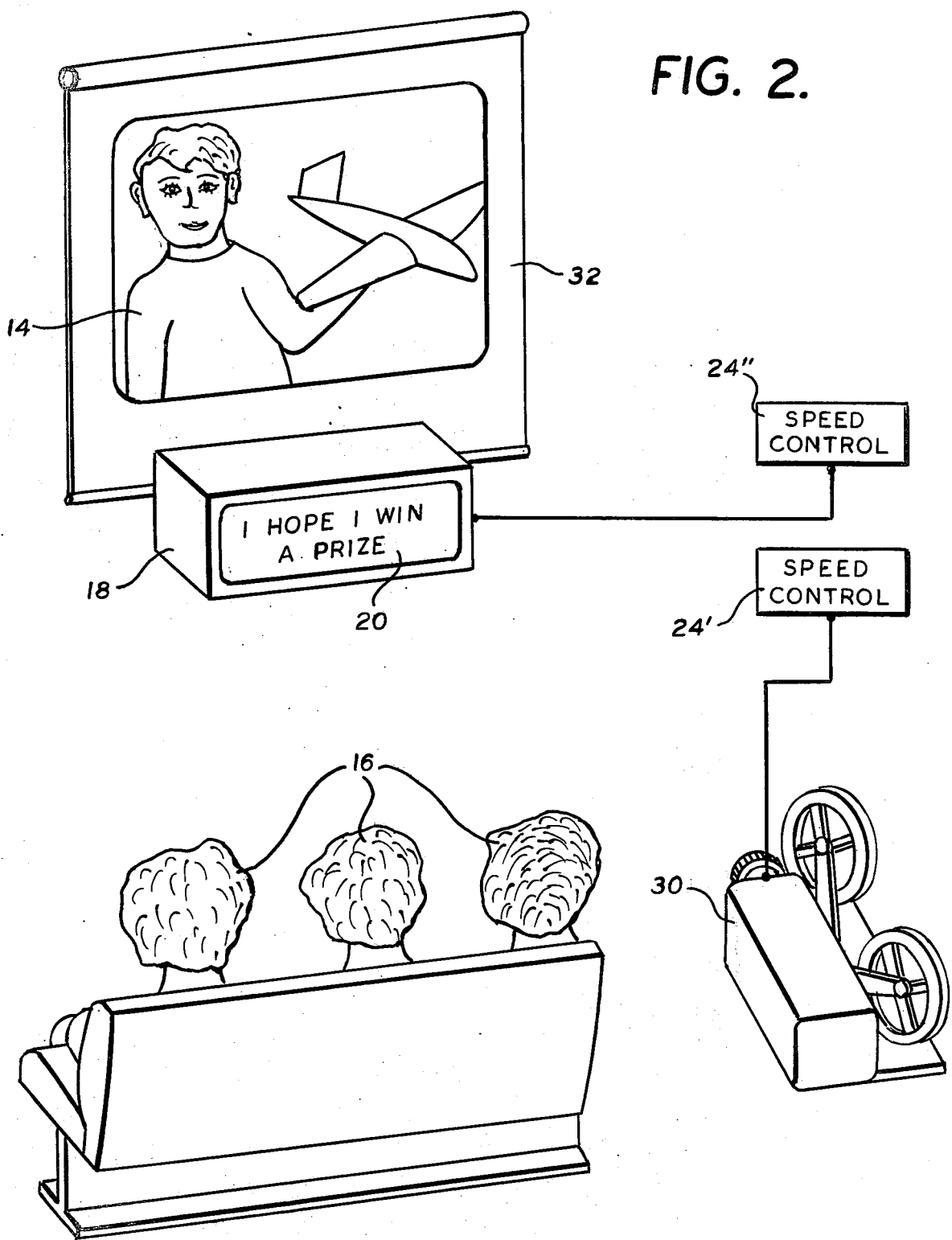

METHOD OF TEACHING SPEECH READING

BACKGROUND OF THE INVENTION

1. Field of the Invention

This invention pertains to a method for teaching speech reading and to apparatus for carrying out the method.

2. Prior Art

Speech reading, often referred to as lip reading, is a tremendous asset to persons who are either deaf or hard of hearing. Typically, speech reading has heretofore been taught by first teaching the student the position of the various visible facial articulatory structures corresponding to the individual sounds which, when uttered in proper combination, comprise speech in the particular language being taught. While this is relatively easy to do, the next step, in which the student is taught to speech read at normal conversational speech rates, is more difficult. This latter step is most often accomplished by having the instructor mouth a particular word or group of words which the student then attempts to identify. As the student becomes more proficient, the instructor increases his speech rate until the student is able to speech read at conversational speech rates. A more synthetic approach has also been employed in which facial, gestural and environmental cues are emphasized, and the student begins to speech read at a word, phrase, or higher level.

These approaches have met with limited success due to a number of drawbacks inherent in the techniques used in teaching them. First, different persons employ facial articulatory structures in different manners for the production of the same sounds. As a result, once a student has learned speech reading with a particular instructor he may have difficulty speech reading the speech of other persons. Second, the teaching methods currently employed are quite tedious, with the result that the student quickly loses interest. This is especially true with adults. Thirdly, while the use of gestural and environmental cues can presently be encouraged and taught, there is typically little carry over of their use to the student's everyday life because of shortcomings in the techniques currently used to teach them, e.g. a limited number of environmental cues can be practiced in a therapy type setting.

SUMMARY OF THE INVENTION

According to the present invention, I have developed a new method for teaching speech reading which overcomes many of the disadvantages of the prior art.

According to the method, a first moving image comprising the facial articulatory structure of at least one person is disposed in view of the student or students to be instructed. Preferably, the first image is a video image in the form of a TV show displayed on a conventional TV unit. Also disposed in view of the students, preferably directly above the TV unit, is a second moving image of alphanumeric indicia representing the words spoken by the person or persons appearing on the TV show. This second image is preferably displayed on a conventional teleprompter.

The display of the two images is controlled such that preferably the alphanumeric indicia appear on the teleprompter screen slightly in advance of the facial articulatory structures corresponding thereto appearing on the TV screen. By glancing back and forth between the two images, the students can first observe the alphanumeric indicia corresponding to the words about to be spoken, and next observe the facial articulatory structure of the persons appearing on the television screen as they speak those words. By knowing in advance what the people appearing on the television screen are going to say, the students are able to learn speech reading in a conversational atmosphere while being entertained at the same time. This serves to reduce the tedium present in prior art speech reading teaching methods and also exposes the students to the facial articulatory structures of a number of different persons. In addition, the student will learn to detect gestural and environmental cues in the real life situations portrayed on the TV shows which ability will carry over into situations he faces in everyday life.

An additional advantage of the method is that it may be used to simultaneously instruct a plurality of students.

Further features and advantages of the method and apparatus according to the present invention will become more fully apparent from the following detailed description and annexed drawings of the preferred embodiments thereof.

BRIEF DESCRIPTION OF THE DRAWINGS

In the drawings

FIG. 2 is a perspective view of an alternative apparatus that may be employed when practicing the method of the invention.

DETAILED DESCRIPTION OF THE PREFERRED EMBODIMENTS

Figure 1:
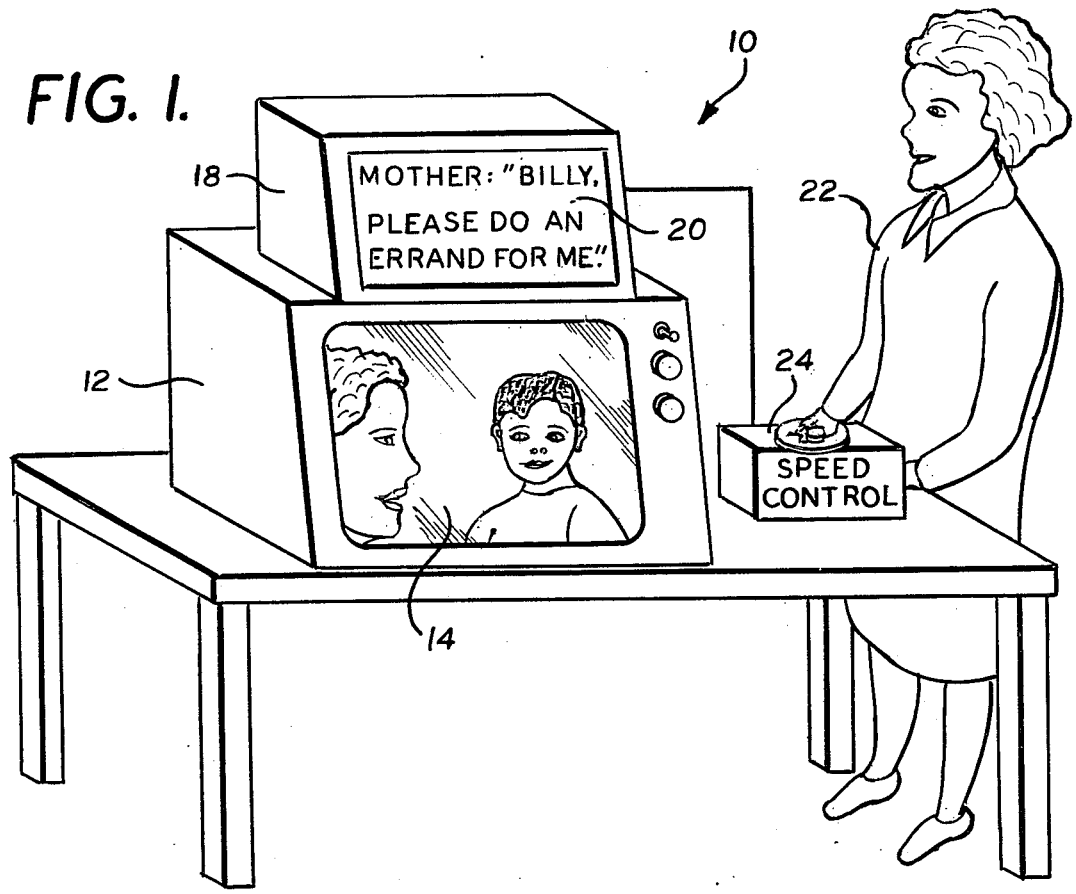
FIG. 1 is a perspective view of the preferred apparatus employed when practicing the method of the present invention.

Referring now to the drawings and particularly to FIG. 1 thereof, the preferred apparatus 10 employed when teaching speech reading according to the method of the present invention is illustrated.

As shown, apparatus 10 includes a first visual display 12 on which a first moving image 14 of the facial articulatory structure of one or more persons is displayed a large portion of the time. The display 12 is disposed in plain view of the student or students 16 to be instructed which may be either children or adults. As presently preferred and shown, display 12 is a conventional TV unit although skilled art workers will immediately recognize that other visual displays, some of which will be discussed hereinafter, may be employed with equal success. When a conventional television is employed, image 14 will usually comprise a TV show, although the invention contemplates that specially made videotapes may be used in conjunction with a conventional television.

Disposed near the display 12 and also in plain view of the students 16 is a second display 18 on which a second moving image 20 is displayed. The second image 20 comprises alphanumeric indicia representing the words spoken by the persons appearing on the TV show. As presently preferred and shown, the second display 18 is disposed above the first display 12, although, of course, it may be disposed below or to one side thereof.

While the construction of the second display 18 may be accomplished in a variety of ways readily apparent to those skilled in the art, as presently preferred and shown, display 18 is a conventional teleprompter. As is well known, teleprompters are widely employed as script aids during the filming of TV shows and movies.

During such use, the script, which has been imprinted on a roll of paper, is advanced on the teleprompter screen to assist the actors and actresses in remembering their lines. In fact, it is contemplated that these printed paper sheets will be borrowed, leased or purchased directly from the studios for use in practicing the method of the present invention. Since most TV shows are taped in advance of their air date, a paper roll on which the script of a particular TV show is imprinted could be displayed on the teleprompter 18 when that particular show is broadcast on the television 12. By way of example, a 10 inches electromechanical prompter available from Q-TV, Inc. may be employed.

In order to permit easy viewing of the printed words appearing on the teleprompter screen, the letter characters will preferably be about ⅜ inches in height. The individual lines, which are generally fed vertically across the teleprompter screen, are preferably spaced a distance of approximately ½ inches apart. Of course, by adjusting the dimensions of the alphanumeric indicia any desired number of words could be displayed on the teleprompter at any one time.

While any TV show involving persons speaking may be suitably employed when practicing the method of the invention, preferably the TV show will be one in which a plurality of actors and actresses are speaking one at a time. Also, it is desirable that the speech be relatively noncontinuous so that the students 16 will have an opportunity to glance back and forth between the first 14 and second 20 images as will be more fully explained hereinafter. Moreover, it is advantageous if the TV show contains scenes which correspond to situations faced by people in everyday life. For this purpose it has been found that those TV shows commonly referred to as "soap operas" may be effectively employed.

Preferably, the rate of movement of the roll being displayed on the teleprompter 18 will be manually controlled by an instructor 22. This may be accomplished in a variety of ways such as, for example, by employing a conventional manually operable variable speed motor controller, illustrated diagrammatically by the reference numeral 24 in FIG. 1. In this way the time interval between the appearance of the printed words on the teleprompter 18 and the articulation of the same words by the actors and actresses appearing on the television 12 may be varied. Preferably, controller 25 will also allow the roll to be stopped. This may be necessary, for example, during commercials, since the words spoken by the persons appearing in the commercials will generally not be printed on the same roll as the script for the TV show, although, of course, skilled art workers will immediately recognize that this too could be readily accomplished. By way of example, controller 24 may comprise the hand remote control unit available from Q-TV, Inc.

Students who are taught speech reading according to the method of the present invention may have already learned the various articulatory structures which correspond to the various sounds which, when uttered in proper combination and sequence, comprise speech in the particular language they are learning to speech read. However, this is not mandatory and the method of the invention could be employed without this step.

In practice, the students 16 will sit in front of the displays 12, 18 while the instructor 22 operates the controller 24. By varying the speed of the roll being displayed on the teleprompter 18 the instructor 22 can control the sequence of the images 14, 20 such that the facial articulatory structures of the person or persons appearing in the TV show will appear shortly after the printed words corresponding thereto are displayed on the teleprompter 18. By glancing back and forth between the two moving images 14, 20 the students will first view the printed words displayed on the teleprompter and then observe the facial articulatory structures of the actors and actresses as they speak those words. The time delay will vary according to the student(s) needs.

Once the students 16 become more advanced, they may control the variable speed control 24 themselves. In this way they can adjust the rate of appearance of the words on the teleprompter 18 according to their own abilities. This is most effective where individual students are being instructed.

As the student's ability further increases, it may be desirable to display the words on the teleprompter after they have been spoken by the actors and actresses appearing on the television 12. In this way the students can test their ability to speech read and thereby measure their progress. This can be easily accomplished by means of the controller 24.

By employing the method of the present invention the students are simultaneously entertained and instructed thereby avoiding the tedium which has seriously impaired the effectiveness of prior art speech reading teaching methods. Another advantage of the present invention is that the student will learn to speech read by viewing a number of different speakers. In this manner, problems arising from learning speech reading by viewing one teacher will be eliminated.

Also, the method permits the students to learn speech reading in a variety of simulated environments as portrayed on the TV shows thus enhancing their ability to make use of gestural and environmental cues in real life situations.

In one alternative embodiment the teleprompter is replaced by a conventional slide projector-screen combination. Groups of printed words imprinted on the slides can then be displayed by the slide projector. Preferably, these slides will be displayed when no speech is occurring on the display 12 or during commercials, at which time the display 12 may be turned off to avoid any possible distraction.

While using the slides to display extended segments of printed matter does not allow the students to memorize all the material about to be spoken, they do generally retain a good part of it.

The advantage of this embodiment is that it permits the students to follow what the actors and actresses are saying without having to continuously glance back and forth between the two visual displays.

Referring now to FIG. 2, a further alternative embodiment of an apparatus which may be employed when practicing the method of the present invention is illustrated in which the first display comprises a movie projector 30 - screen 32 combination. When this embodiment is employed, a still further variation in the speech reading technique according to the present invention is possible. In this embodiment, the speech rates of the person or persons appearing on the movie screen 32 may be controlled by controlling the speed of the projector 30. Thus, by connecting the moving picture projector 30 and the teleprompter 18 to conventional variable speed controllers 24' and 24", respectively, the speech rate of the actors, as well as the rate at which the printed words are displayed, may be reduced. This embodiment is particularly useful when the persons appearing on the movie screen 32 are speaking very rapidly.

As a yet further alternative, the necessity of the display 18 may be obviated by displaying the printed words as subtitles located, for example, on the bottom of the first moving image 14 appearing on the display 12. This would simply involve subtitling the complete script of the show appearing on the display 12 in the same language being spoken by the actors or actresses as opposed to the conventional situation in which the subtitles are in a different language and often present only a synopsis of what is being spoken. In the event a movie projector and screen are employed to provide the first moving image 14, the rate at which the participants are speaking as well as the rate at which the subtitles appear on the screen may be simultaneously controlled by simply controlling the speed of the projector. This may be done, for example, by employing a conventional variable speed motor controller as is more fully explained above.

It may often be desirable to display explanatory material in addition to the printed words appearing on the display 18. For example, when the facial articulatory structures of the persons appearing on the display 12 are not visible to the students, this might be noted in order to avoid confusion. Also, drawings of particular facial articulatory structures, or symbols representing them, may be displayed next to the words in which they are used as a further instructional aid to the students. Further, the name of the actors and actresses who will speak the words may also be included. Thus, the invention contemplates that matter other than the printed words spoken by the persons appearing on the display 12 may appear on the display 18.

Moreover, while it is preferred that the words be displayed in printed form, it is apparent that script, italics and other forms of alphanumeric indicia may be employed. Accordingly, the term "printed" as used throughout this application is intended to encompass all such possible variations. Also, the phrase "moving images" as used throughout this application means any image that changes with time and is not limited to images that are continuously changing with time.

Since these and other modifications are within the intended scope of the present invention, the above description should be construed as illustrative and not in the limiting sense.

What is claimed is:

1. A method of teaching speech reading comprising the steps of:
   displaying a first moving image, said first moving image comprising the facial articulatory structures of at least one person;
   displaying a second moving image, said second moving image comprising alphanumeric indicia representing the words spoken by said at least one person; and
   controlling the display of at least one of said first and second moving images for varying the time interval between the display of said facial articulatory structures and the display of the particular alphanumeric indicia corresponding thereto.

2. The method according to claim 1, wherein said facial articulatory structures are displayed after the display of said particular alphanumeric indicia corresponding thereto.

3. The method according to claim 1, wherein said facial articulatory structures are displayed before the display of said particular alphanumeric indicia corresponding thereto.

4. The method according to claim 1, wherein the image display being controlled is said second moving image.

5. The method according to claim 1, wherein said second moving image is displayed above said first moving image.

6. The method according to claim 1, wherein the image display being controlled is said first image whereby the speech rate of said at least one person may be altered.

7. The method according to claim 1, wherein said second moving image is superimposed on said first moving image.

8. The method according to claim 1, wherein said display controlling step is accomplished manually.

9. Apparatus for teaching speech reading comprising:
   means for displaying a first moving image, said first moving image including the facial articulatory structures of at least one person;
   means for displaying a second moving image, said second moving image including alphanumeric indicia representing the words spoken by said at least one person; and
   means for controlling the display of at least one of said first and second moving images for varying the time interval between the display of said facial articulatory structures and the display of the particular alphanumeric indicia corresponding thereto.

10. The apparatus of claim 9, wherein said first moving image displaying means comprises a television unit.

11. Apparatus according to claim 9, wherein said first moving image displaying means comprises a movie projector.

12. Apparatus according to claim 9, wherein said second moving image displaying means comprises a teleprompter.

13. Apparatus according to claim 9, wherein said second moving image displaying means comprises a slide-projector.

14. Apparatus according to claim 9, wherein said control means is manually controllable.

15. Apparatus according to claim 9, wherein said control means comprises means for controlling the rate of movement of at least one of said moving images.

* * * * *

UNITED STATES PATENT OFFICE
CERTIFICATE OF CORRECTION

Patent No. 4,121,357   Dated October 24, 1978

Inventor(s) Sidney R. Hoffman

It is certified that error appears in the above-identified patent and that said Letters Patent are hereby corrected as shown below:

Column 3, line 46: "controller 25" should read -- controller 24 --.

Signed and Sealed this

Twentieth Day of February 1979

[SEAL]

*Attest:*

RUTH C. MASON
*Attesting Officer*

DONALD W. BANNER
*Commissioner of Patents and Trademarks*